United States Patent [19]

Muther

[11] 4,081,501
[45] Mar. 28, 1978

[54] PROCESS FOR PRODUCING ODOR ABSORBENT AND ADSORBENT AIR FILTER MEDIA

[76] Inventor: John P. Muther, 8600 Queensmere Pl., Richmond, Va. 23229

[21] Appl. No.: 704,078

[22] Filed: Jul. 9, 1976

[51] Int. Cl.² .............................................. B29C 17/04
[52] U.S. Cl. ........................................ 264/89; 264/91; 264/121
[58] Field of Search ............................. 264/91, 121, 89

[56] References Cited
U.S. PATENT DOCUMENTS

| 3,755,522 | 8/1973 | Jope et al. ................................ 264/89 |
| 3,819,435 | 6/1974 | Roberts et al. ...................... 264/121 |

Primary Examiner—Robert F. White
Assistant Examiner—James R. Hall
Attorney, Agent, or Firm—Richard P. Matthews

[57] ABSTRACT

Dry, odor absorbent and adsorbent particulate is injected into an air pervious mat of randomly overlaid fibers by a first stream of pressurized air, and is distributed among the fibers for bonding thereto by a second stream of pressurized air. Particulate which fails to bond to the fibers is withdrawn and collected, preferably from both sides of the mat. Distribution of the odor absorbent particulate among the mat fibers is controlled by controlling air stream directions, volumes and pressures and by reflecting back into the mat a selected portion of the pressurized air which has traveled through the mat.

10 Claims, 2 Drawing Figures

PROCESS FOR PRODUCING ODOR ABSORBENT AND ADSORBENT AIR FILTER MEDIA

BACKGROUND OF THE INVENTION

The present invention relates generally to air filters from environmental air recirculating systems, and more particularly to a process for forming odor absorbent environmental air filtration media.

It has long been the practice in environmental air recirculating systems to use substances such as activated carbon, activated alumina, and the like for odor removal. Proposals have been made to adhere such substances to fibrous air filtration media so that a single filter element can simultaneously perform the dual functions of odor and particulate removal.

One problem which has been encountered in efforts to implement such proposals is that of properly distributing a sufficient quantity of odor absorbent material among the fibers of filter media for bonding thereto. A sufficient quantity of absorbent material must be adhered to the fibers if the filter is to be effective in absorbing odors, and effecting a controlled distribution of the absorbent material among the fibers has been difficult to achieve.

Efforts to distribute and bond dry particulate odor absorbent materials such as small particles of activated carbon among the fibers of a mat have resulted in the creation of such large quantities of dust and "fallout" as to prohibit their gaining commercial acceptance. Attempts to overcome the dust problem have included such proposals as the pretreatment of carbon particles with wetting agents and the like. These pretreating steps are not only expensive to carry out but also tend to reduce the odor absorbing effectiveness of the particulate due to the wetting agent's being absorbed by the particulate.

Still another problem with previous proposals has been that of obtaining high speed filter production. Where dry particulate odor absorbent materials have been used, the problems of dust and effecting proper particulate distribution and bonding have inhibited efforts to obtain high speed production.

One problem that has been addressed with success in the prior art is that of forming a mat of fibrous filter material. Mats of randomly overlaid fibers are readily produced by a commercially available apparatus known in the art as a "Rando-Webber" machine, manufactured by Curlator Corporation, Rochester, N.Y. Another commercially available mat forming apparatus is known as a "Garnett Machine". Mats manufactured by such machines may include man-made or natural fibers, or both, customarily including matting of variable deniers and densities and may be treated with binders, adhesives, tackifiers, plasticizers, flame-retardants, stiffeners and the like as is desired to provide a media suitable for filtering recirculated environmental air in homes, offices and the like. Filtration characteristics of the media are determined by the fiber size, and the density and thickness of the mat, and the type of additives adhered to the fibers.

Another problem which has been addressed with adequate success in the prior art is that of providing bonding agents which can be used to adhere odor absorbent materials to the fibers in a mat. In some instances, substances which are used to treat fibrous mats to stiffen them and to hold their fibers in place remain tacky long enough to serve the additional function of helping to bond absorbent materials to the fibers. In other instances, additional commercially available bonding agents may be applied to the fibers to assure good bonding of odor absorbent particles.

SUMMARY OF THE INVENTION

The present invention overcomes the foregoing and other drawbacks of the prior art by providing a novel and improved system for forming odor absorbent filter media using dry particulate odor absorbent material.

An air pervious mat of randomly overlaid fibers is formed in a conventional manner using, for example, a Rando-Webber machine. The mat, or at least the mat portion to be provided with odor absorbent material is moved along a path of travel past first and second closely spaced distribution head structures. Dry, odor absorbent particulate material is injected into the mat portion among its fibers by a first or "primary" stream of pressurized air discharging through the first distribution head structure. The injected particulate material is distributed as desired among the mat portion fibers by a second or "secondary" streams or banks of secondary air pressure nozzles by pressurized air discharging through the second distribution head structure or series of structures. At least a part of, but preferably the majority of, the injected and distributed particulate material may then be bonded to the mat portion fibers. The remainder of the particulate material is withdrawn from the mat portion and collected for recycling.

A significant feature of the present invention lies in the simplicity and speed with which it is able to effect a desired distribution of a large quantity of particulate material among the fibers of a mat portion. The use of a primary, usually relatively low pressure air stream to introduce or inject particulate material into the mat, and the use of a secondary, preferably higher pressure air stream to effect its distribution is, despite its simplicity, an effective approach that permits continuous production of environmental air filtration media at higher speeds than previous proposals would permit.

Still another feature of the preferred practice of the present invention is that it obviates dust problems. Withdrawal and collection of excess particulate material is preferably effected using vacuum collection equipment. The use of one or more secondary air streams near the particulate injection head structure together with proper shields also helps to prevent the escape of dust and small particles.

Still another feature of the preferred practice of the present invention lies in its use of "rebound" or "reflected" pressurized air to assist in the distribution of odor absorbent particulate material among the mat portion fibers. In preferred practice, the mat portion is supported on an air pervious structure such as a perforated conveyor belt for movement beneath the first and second distribution head structures. An apertured structure, preferably a perforated plate, is positioned below the belt at a location beneath at least one of the head structures. The plate operates to reflect back into the mat portion at least a portion of the pressurized air which has passed through the mat portion, and this reflected air assists in controlling particulate distribution.

Vacuum collection equipment for withdrawing excess particulate preferably includes vacuum heads located on both sides of the moving mat and extending the full width of the mat. One set of vacuum heads is preferably located beneath the described perforated plate.

Another set is preferably located above the mat, downstream from the secondary distribution head or heads.

Control of the type of particulate distribution which is effected in different types of fibrous mats is provided by selecting the angles at which the first and second air streams discharge toward the mat portion's travel path, by selecting the pressures and volumes of the primary and secondary air streams, and by using reflection plates which have different types and sizes of perforations.

In preferred practice, the primary air stream distribution head structure includes a plurality of distribution heads arranged side-by-side across the width of the mat. The heads operate to introduce particulate material in spaced areas of concentration such that there is little or no distribution area overlap between adjacent heads. Primary air stream pressure is preferably within the range of about 1 to about 120 psig and the primary stream direction is preferably within the range of about 30° to about 150° relative to the direction of the mat portion travel path.

The secondary air stream distribution head structure can be formed from one or a plurality of commercially available "distribution heads" or nozzles located side by side across the width of the mat. When two successive banks of secondary nozzles are used, it has been found advantageous to direct a relatively low pressure volume of air over a larger area from the first bank to dirve the particulate material a slight distance into the matting and then follow this with air at a higher pressure and smaller area from the second bank of secondary nozzles to drive the particulate further into the matting. Secondary air stream pressures are preferably within the range of about 1 to about 250 psig and operates at a discharge angle of within the range of about 30° to about 150° relative to the direction of the mat portion travel path.

The distribution or secondary head structure is downstream along the travel path from the injection or primary head structure. Baffles or vanes may be included in one or both of the primary and secondary head structures to facilitate controlling the angles at which their air streams discharge toward the travel path.

These and other features and a fuller understanding of the invention may be had by referring to the following description of the preferred embodiment taken in conjunction with the accompanying drawing.

DESCRIPTION OF THE PREFERRED EMBODIMENT

Figure 1:
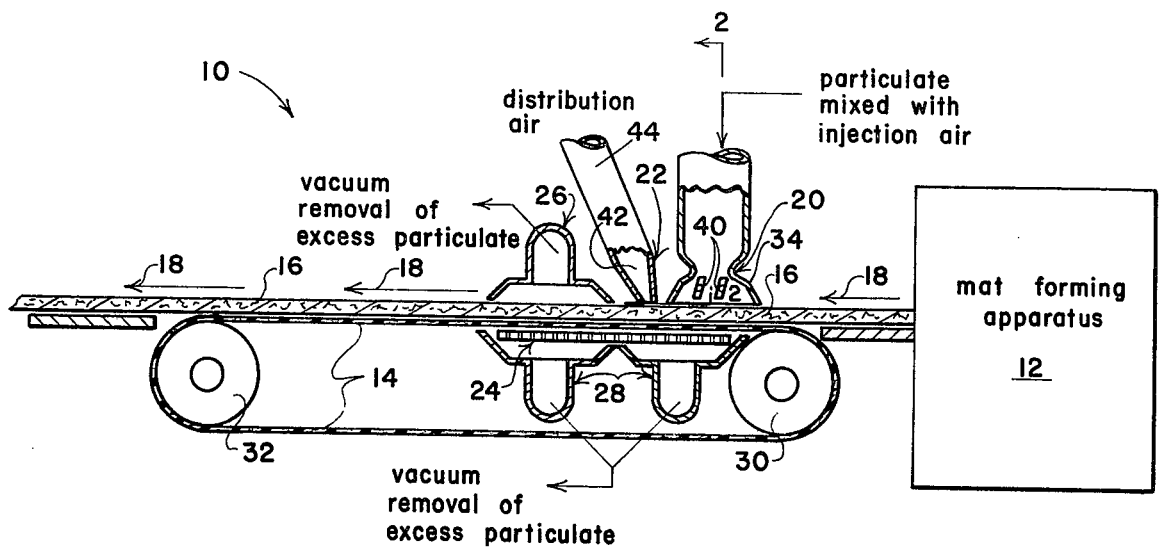
FIG. 1 is a side elevational view with portions broken away and shown in cross-section illustrating an apparatus used in the preferred practice of the present invention; and, FIG. 2 is a fragmentary sectional view as seen from a plane indicated by a line 2—2 in FIG. 1.

Referring to FIG. 1, a system for producing odor absorbent filter media is indicated generally by the numeral 10. The system 10 includes conventional mat forming apparatus, indicated generally by the numeral 12. A porous or perforated conveyor belt or chain 14 conveys a fibrous mat 16 from the apparatus 12 along a substantially horizontal travel path as indicated by arrows 18. A first distribution head structure 20 directs a first or "primary" stream of pressurized air mixed with odor absorbent particulate toward the mat 16. This first air stream injects particles of odor absorbent material into the mat 16 among its fibers. A second distribution head structure 12 directs a second or "secondary" stream of pressurized air toward the mat 16 and effects a desired distribution of the injected odor absorbent particles among the mat fibers. An apertured structure 24 underlies the conveyor belt 14 at a location beneath at least one of the head structures 20, 22 and causes at least part of the pressurized air which has passed through the mat 16 to "bounce" or "reflect" back into the mat 16 to further assist in distributing the particulate material. A vacuum collection system, including upper and lower collection heads is indicated generally by the numerals 26, 28. The heads 26, 28 withdraw excess particulate material from the mat 16 for recycling.

The apparatus 12 is of conventional configuration and preferably includes what is known in the art as a "Rando-Webber" machine. Such an apparatus forms an air-laid mat of randomly overlaid fibers. The fibers may be man-made or natural or both. The apparatus indicated by the numeral 12 may also include conventional preliminary mat treating equipment for applying such additives as binders, adhesives, tackifiers, plasticizers, flame retardants, stiffeners and the like to the mat as may be desired. In accordance with the present invention, additives may be applied to the mat before, during, and/or after injection and/or distribution of odor absorbent material. If such additives are sufficiently tacky to serve the added function of assisting in bonding odor absorbent particles to the mat fibers, no additional bonding agent may need be applied to the mat 16. If an additional bonding agent is required to hold the particulate material on the mat fibers, it may be applied within the apparatus 12, or downstream therefrom using conventional equipment.

Many suitable bonding agents are known in the art and need not be described here. Bonding agents which are highly volatile should be avoided as they tend to be absorbed by the particulate and reduce its odor absorbent capability.

The conveyor belt or chain 14 forms a continuous loop and is reeved around two rolls 30, 32. The roll 32 is driven by a variable speed motor, not shown.

Figure 2:
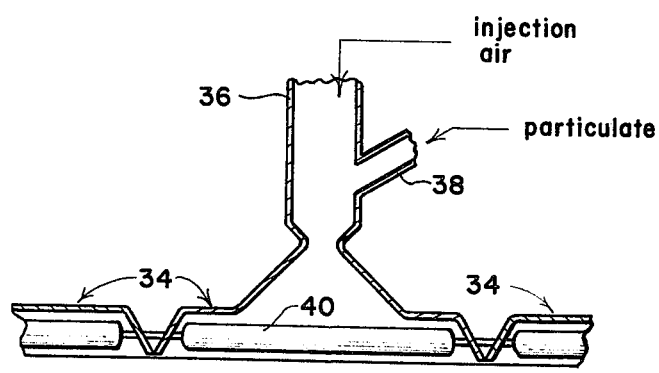

Referring to FIG. 2, the first distribution head structure 20 preferably includes a plurality of substantially identical distribution heads 34 arranged side by side across the width of the mat 16. Conduits 16 communicate the heads 34 with a source of pressurized air, not shown. Conduits 38 communicate the heads 34 with a source of odor absorbent particulate, not shown. Pressurized air and odor absorbent particulate material from the conduits 36, 38 mix in the heads 34, and the mixture discharges through the heads 34 and into the mat 16 in a first or "primary" air stream which preferably has a pressure in the range of about 1 to about 120 psig. It is possible to vary the orifice size of conduit 38 in order to effect a metering of particulate material injected into the mat material.

Adjustable direction vanes 40 may be provided inside the heads 34 to control the direction at which the primary air stream discharges toward the mat 16. The vanes 40 are set to control this direction within the range of about 60 degrees to either side of an imaginary plane which extends across the width of the mat 16 and which is perpendicular to the plane of the mat 16. Stated in another way, the primary air stream direction is adjustable within the range of about 30° to about 150° relative to the travel path direction indicated by the arrows 18. Means other than the vanes 40 can be used to control air stream direction.

Referring again to FIG. 1, the second distribution head structure 22 may include a plurality of side-by-side heads but preferably includes a single, elongated, multi-orificed head 42 which extends the full width of the mat 16. A conduit 44 communicates the head 42 with a second source of pressurized air, not shown. Pressurized air from the head 42 discharges in a "secondary" air stream toward the mat 16 and helps to distribute injected particulate material among the mat fibers for bonding thereto. Movable vanes, not shown, may be provided inside the head 42 to control the direction at which the secondary air stream discharges toward the mat 16. Alternatively, the configuration of the head 42 is designed to provide a desired distribution air trajectory with one or more banks of heads. Alternate head configurations are substituted when it is desirable to change the trajectory of air discharging from the head 42. By these means, the direction of introduction of distribution air is controlled within the range of about 60° to either side of an imaginery plane which extends across the width of the mat 16 and which is perpendicular to the plane of the mat 16. Stated in another way, the direction of the secondary air stream or streams are adjustable within the range of about 30° to about 150° relative to the travel path direction indicated by the arrows 18. The apertured structure 24 is a perforated plate which closely underlies the conveyor belt 14. The structure 24 underlies at least a portion of one of the head structures 20, 22 and intercepts pressurized air which has passed through the mat 16. It is found that the structure 24 causes at least a portion of such pressurized air to "bounce" or "reflect" back into the mat 16. This reflected air flow enhances the distribution of odor absorbent particulate among the mat fibers.

Fibrous mats of different fiber size, density and thickness require different air stream pressures, patterns, volumes and directions to effect desired distributions of particulate among the mat fibers. An adjustment of air stream pressures and directions is usually required when mat travel speed is changed. The use of interchangeable apertured structures 24 having different numbers and sizes of apertures also influences the type of particulate distribution achieved with the system 10. The versatile, adjustable nature of the system 10 permits almost any type of desired particulate distribution to be effected at a wide range of mat travel speeds and with a wide variety of mat constructions.

The upper collection heads 26 connect with a vacuum generator, not shown, and function to withdraw excess particulate materials along the topside of the mat 16. The lower connection heads 28 also connect with a vacuum generator, not shown, and function to provide a relatively low pressure area beneath the belt 14 which helps to withdraw excess particulate from the mat 16 and to collect such particulate for recycling.

By the term "particulate", it should be understood that particles of almost any size are included, ranging from very fine powder to particles having a diameter of 5 to 6 millimeters. The preferred odor absorbent material for use in the system of the present invention is activated carbon. Other materials and mixtures thereof can be used with or in place of activated charcoal, including such materials as activated alumina, alkali metal aluminosilicates, volcanic ash, calcium carbonate, sodium carbonate and the like.

Air filter media produced in accordance with the present invention can be bonded together to form a thicker media, or can be bonded to or used with other types of filter media to provide filters that vary in properties from one side to the other. It is also possible to use two treated or untreated medias and distribute the particulate on one or both sides prior to bonding both medias together to form a final end product.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A process of forming odor absorbent filter media for use in an environmental air recirculating system, comprising the steps of:
   a. forming an air pervious mat of randomly overlaid fibers;
   b. moving the mat along a path of travel past first and second closely spaced distribution head means;
   c. directing a first stream of pressurized air discharging through the first distribution head means to inject dry, odor absorbent particulate material into the mat among its fibers;
   d. directing a second stream or streams of pressurized air discharging through the second distribution head means to effect a desired distribution of the injected particulate material among the mat fibers;
   e. thereafter applying a bonding agent to said mat so as to form a bonded mat and to bond a part of the injected and distributed particulate material to the mat fibers; and
   f. withdrawing and collecting the unbonded injected and distributed particulate material from said mat leaving the odor absorbent filter media.

2. The process of claim 1 wherein step (b) is effected by supporting the mat on a movable, air pervious structure which moves along the travel path beneath the first and second distribution head means, and step (f) is effected at least in part by passing said withdrawn particulate material through the structure.

3. The process of claim 2 wherein apertured means beneath the air pervious structure is located beneath at least one of the distribution head means to reflect back into the mat at least a part of the pressurized air discharging from said second distribution head means thereby assisting in the distribution of injected particulate material among the mat fibers.

4. The process of claim 2 wherein step (f) is also effected, at least in part, by a vacuum downstream from the first and second distribution head means on the opposite side of the mat from the air pervious structure.

5. The process of claim 1 wherein the pressure of the first air stream is about 1 to about 120 psig.

6. The process of claim 1 wherein the pressure of the second air stream is about 1 to about 250 psig.

7. The process of claim 1 in which in steps (c) and (d) the direction of the first and the second air streams relative to the direction of travel of the mat forms an angle from about 30° to about 150°.

8. The process of claim 1 wherein the dry particulate material injected into the mat is activated carbon.

9. The process of claim 1 wherein the first and second distribution head means discharge air streams into a common side of the mat, and at least a portion of the remaining injected and distributed particulate material is withdrawn from the opposite side of the mat.

10. The process of claim 9 wherein at least another portion of the unbonded injected and distributed particulate material is withdrawn from the common side of the mat.

* * * * *